United States Patent [19]

Adrian

[11] Patent Number: 4,938,673
[45] Date of Patent: Jul. 3, 1990

[54] ISOSTATIC PRESSING WITH MICROWAVE HEATING AND METHOD FOR SAME

[76] Inventor: Donald J. Adrian, 7456 N. 53rd St., Milwaukee, Wis. 53223

[21] Appl. No.: 308,901

[22] Filed: Jan. 17, 1989

[51] Int. Cl.$^5$ .............................................. B22F 1/00
[52] U.S. Cl. ........................................ 419/23; 419/30; 419/42; 419/49; 419/52
[58] Field of Search ...................... 419/23, 38, 42, 49, 419/52

[56] References Cited

U.S. PATENT DOCUMENTS

| | | | |
|---|---|---|---|
| 4,695,695 | 9/1987 | Meek et al. ........................... | 501/97 |
| 4,719,078 | 1/1988 | Miyashita et al. ..................... | 419/53 |
| 4,744,943 | 5/1988 | Timm .................................... | 419/10 |
| 4,778,626 | 10/1988 | Ramn et al. ............................ | 419/48 |
| 4,813,124 | 3/1989 | Klimek .................................. | 419/49 |
| 4,857,266 | 8/1989 | Sheinberg et al. ..................... | 419/22 |

OTHER PUBLICATIONS

Sutton, "Microwave Processing of Ceramic Materials", *Ceramic Bulletin* 68(2) (1989):376–381.
Krause, "Microwave Processing of Ceramics: An Interdisciplinary Approach, " *Oak Ridge National Laboratory Review*, 1 (1988):48–51.
Swain, "Microwave Sintering of Ceramics", *Advanced Materials and Processes Inc. Metal Progress*, Sep., 1988, 76–82.
Gabriele, "New Oil Drill Bits Made via P/M Densification Tested; and Ceracon Awarded $500,000 Numa Tool Contract for New Powdered-Metal Densification System", *Metalworking News* (Oct. 17, 1988).

*Primary Examiner*—Stephen J. Lechert, Jr.
*Attorney, Agent, or Firm*—Levy, Zito & Grandinetti

[57] ABSTRACT

The invention includes an isostatic press supply of heat to a workpiece by microwave energy and a method for isostatically pressing a powdered ceramic or powdered metal material that is heated by microwave energy. The isostatic press includes a pressure vessel. A fluid medium is available for supply to the pressure vessel under pressure. The invention further includes a means for transmitting microwave energy into the pressure vessel. The method includes preparing a workpiece comprising a microwave coupler material. Desirably, the workpiece is a composition comprising a powdered coupler or semiconductor and a powdered insulator. The workpiece is immersed in an additional powdered insulator which is transparent to the microwave energy. The workpiece and immersing powdered insulator are contained in a closed, compressible container. The contained, immersed workpiece is then placed into a pressure vessel. Microwave energy is transmitted into the pressure vessel at a sufficient frequency to couple with the coupler. A fluid medium is supplied into the vessel under pressure either concurrently and/or before and/or after the transmission of microwave energy. The microwave energy couples with the coupler which causes the insulator of the workpiece to heat. The immersing insulator that surrounds the workpiece remains cool.

14 Claims, 4 Drawing Sheets

ISOSTATIC PRESSING WITH MICROWAVE HEATING AND METHOD FOR SAME

BACKGROUND OF THE INVENTION

1. Field of the Invention

The invention relates to an apparatus and a method for isostatic pressing with microwave heating. Specifically, the invention relates to an apparatus and a method for isostatically pressing ceramic or powdered metal materials while heating the materials by microwave energy.

2. Description of the Background Art

Developments in material science are producing new materials made from ceramics or powdered metals. These new ceramics and metals have characteristics far superior to conventionally produced ceramics or metals. The characteristics of these new materials can include improved toughness, strength, fracture resistance, and thermal expansion coefficients.

The manufacturer of a workpiece or other object from a ceramic or powdered metal material requires an apparatus and a method for compacting and/or applying heat to the material. Apparatuses and methods for applying heat to ceramic or powdered metal materials have traditionally utilized convection furnaces. Certain ceramic materials have been processed by electronic heat generated from either microwave or induction heating. Apparatuses and methods for applying pressure to ceramic or powdered metal materials have utilized both uniaxial and isostatic pressurizing means. The application uniaxial pressure is performed by mechanical means including hot presses. The application of isostatic pressure is performed by either a cold isostatic press, commonly referred to as "CIP" unit, or by a hot isostatic press, commonly referred to as "HIP" unit.

Convection heating is commonly performed with the use of a resistant heating furnace. Resistant heating furnaces are electrically operated furnaces having elements that resist the electric current. Resistant heating furnaces consume relatively large quantities of energy, time, and manpower, compared to other methods of heating, when used in advanced materials production. Resistant heating furnaces create a "hostile" environment for many ceramic or powdered metal materials. The hostile environment can cause sintering and form fractures in workpieces made from these materials during heating. These fractures particularly occur at the surface of the workpieces.

Sintering and fractures result from the more rapid heating of the outer surface of the workpiece in relation to the interior portions or "bulk" of the workpiece. The outer surface of the workpiece convects heat into the interior portion of the workpiece. This causes uneven heating and a delay before the workpiece reaches a uniform heat.

Electronic heating commonly includes induction, dielectric, and microwave heating. These forms of heating vary in their respective apparatuses for generating heat and in the methods by which heating occurs in the material.

Induction heating induces a current in a material. The current is induced by alternating the current in a coil surrounding the material. The coupling of energy in the material is accomplished by magnetic fields. Induction heating typically rises the temperature at the surface of a part first and is best performed with conductor materials such as steel.

Dielectric heating places the material between electrode plates. The energy loss across the electrode plates causes the material to heat. Dielectric heating usually requires a higher frequency of alternating current than is used with induction heating. Dielectric heating is effective with poor electrical and thermal conductors.

Microwave heating applies electromagnetic energy near the far-infrared region. Microwaves have wave lengths from about thirty centimeters to about one millimeter. Microwave energy is created by a microwave generator which produces the electromagnetic energy. The electromagnetic energy is directed to the material by wave guide transmission, resonant cavities, and antennas. Microwave heating applies an alternating or varying electromagnetic field to the material which converts some of the electromagnetic energy into heat in the dielectric or by dielectric loss. Microwave heating is effective with conductive materials and becomes more effective as the temperature of these materials increases.

Microwave energy couples with certain materials and pass through other "transparent" materials. When microwave energy couples with a material, a dielectric loss occurs in the interaction of microwave energy and the material. This dielectric loss creates heat. Transparent materials can be made to couple with microwave energy by elevating the temperature of the material. Materials are generally grouped into "conductors" and "insulators" depending upon whether the materials are readily coupled or are transparent to microwave energy. Relatively poor conductors are termed "semiconductors."

The use of the terms "conductor" and "insulator" with microwave technology is not always desirable. For example, a pure metal is an electrical conductor, but, except at its surface, reflects microwaves. Water is not considered a desirable electrical conductor, but the polarity of its molecules allows it to couple well with microwaves. For these reasons, and for the purposes of describing this invention, the term "conductor" includes any element that is a microwave coupler. The term "insulator" includes any element that is transparent to microwaves. The application of these terms with certain compositions is relative and depends upon the respective dielectric constants of the two or more materials being compared. Generally, the first element in a material to couple with microwaves is considered to be the conductor for that material. The same element in another composition or at a different concentration may not perform as a coupler for the other composition.

The term "coupler" for purposes of this invention includes a conductor or semiconductor dispersed in a nonconductor material. The coupler first develops high electrical charges on its surfaces. This results in capacitance discharges from particle to partical of conductor or semiconductor causing ionization and very rapid heating of the matrix material immediately surrounding the conductor or semiconductor. The ionization and heating of the matrix material results in the matrix material being able to better couple with the microwave field. The term coupler also includes materials that couple well within a given temperature range which assists in the heating of matrix materials and heating to coupling temperature of matrix materials. A coupler can also be a resistive material or sometimes a semiconductor that couples with the microwave field such that it becomes hot enough to heat matrix materials to coupling temperature or to densification temperature.

Materials having polarized molecules provide better couplers for microwave energy than non-polar materials. A mixture of a polarized material with a non-polarized material can generally be heated by microwave energy by the coupling of the polar material first with the microwave energy to create heat. The heat generated by the microwave coupling of the polar material elevates the temperature of the non-polar material by conduction. The rise in the temperature of the non-polar material improves its coupling with the microwave energy. This phenomenon is explained in a book by David A. Copson, *Microwave Heating* (Westport, CT) The AVI Publishing Company, Inc., 1975).

The application of pressure to ceramic or powdered metal materials compacts or forges the individual grains of the material together. The compaction of the grains of the material increases the density of the material such that a powdered ceramic or powdered metal composition can be compressed into a solid. The compaction of grains of a powdered material can increase the density of that material up to an absolute or theoretical density.

A material of theoretical density has no fissures or separations between the molecules of the material and eliminates any individual grains of the material. A material at its theoretical density is a "perfect solid." Materials that are not at their theoretical density contain internal cracks, fissures, or voids which, when the material is put under stress, grow and expand. The growth and expansion of cracks, fissures, or voids causes a workpiece made from the material to break or fail under stress. Workpieces best resist breakage or failure under stress when their materials are at or near theoretical density.

Pressure is traditionally applied to materials, such as metals, by hot pressing or forging operations. These operations involve the use of a ram or repeated hammering to compact the grains and molecules of the material into a higher density. Mechanical operations such as hot pressing or forging apply uniaxial pressure to a material. Uniaxial pressure can compact the material in a direction parallel to the application of the pressure, but can cause the grains or molecules of the material to spread in a direction perpendicular to the application of uniaxial pressure. The application of uniaxial pressure by hot pressing or forging, typically, cannot uniformly compact a material to its theoretical density. This is because the pressure cannot be applied equally from all directions to the material at the same time.

Pressure can be applied in all directions or "isostatically" to a material through a fluid medium surrounding the material. Ceramic and powdered metal materials can be isostatically compacted in a cold isostatic press or a hot isostatic press.

A cold isostatic press applies isostatic pressure to a placed inside a mold formed by a rubber bag. The rubber bag is placed within a pressure vessel. A medium such as oil is then pumped at high pressures into the vessel so as to surround the rubber bag and isostatically compact the rubber bag and the material within the rubber bag. Cold isostatic presses typically operate at pressures between about 3,000 and about 60,000 pounds per square inch and temperatures between atmospheric temperature and about 500° C. When elevated temperatures are used, the materials are heating before being placed into the cold isostatic press.

A hot isostatic press applies isostatic pressure to a material formed into a green body or to a material within a mold or "can." The green body or can is placed into the pressure vessel. The pressure vessel contains a convection furnace and is pressurized by a gas medium such as argon gas. The pressure and temperature within the vessel can be selectively controlled to obtain desired results for a particular material. Hot isostatic presses can operate at temperatures up to about 250° C. and pressures up to about 100,000 pounds per square inch. A description of methods for isostatic pressing is provided by Clauer, et al., *Hot Isostatic Pressing* (Columbus, Ohio: Metals and Ceramics Information Center, 1982).

Hot isostatic presses are desirable for compacting powdered ceramic or powdered metal materials to near their theoretical or "near net" density. Hot isostatic presses can elevate the temperature of a material to its transition temperature between being a solid and a liquid while applying very high pressure isostatically through a gas or fluid medium. The use of a hot isostatic press requires a large amount of energy and considerable time to elevate the interior or hot zone of the vessel to a desired operating temperature. This energy and time consumption is required because hot isostatic presses use side zone furnaces having molybdenum radiation plates through which an electric current passes. The electric current is resisted by the molybdenum radiation plates and generates heat through the fluid medium or gas. The heat is convected through the fluid medium to the workpiece.

A workpiece, being processed by a hot isostatic press, is first heated at its surface and is convected through the workpiece to its interior. Once a workpiece is held at the desired temperature and pressure for the desired amount of time, the workpiece as well as the furnace and interior portion of the vessel must be cooled before the vessel can be opened and the densified workpiece removed. The cooling process is typically performed through a liquid cooling liner wherein heat is transferred to a liquid coolant. It is not uncommon for one complete "cycle" of hot isostatic pressing to last between about four hours and about 24 hours. A cycle involves placing the workpiece in the vessel, elevating the temperature and pressure of the workpiece, and cooling of the workpiece. The time required to conduct a hot isostatic pressing cycle, as well as the special operating procedures required for handling advanced materials and operating equipment at high temperatures and pressures, has inhibited the use of isostatic pressing in high production or assembly line manufacturing.

The use of electronic heating with methods for compacting or densifying powdered ceramics or powdered metals has, also, not been generally successful or readily adaptable to high production or assembly line manufacturing procedures. The reasons for the failure to combine methods for electronic heating with compaction of powdered ceramics or powdered metals is often due to the incompatibility of the various apparatuses required to operate an electronic heat generating means with a pressure applying means. The following documents demonstrate the state of the background art for electronically heating compacted powdered ceramics or powdered metals.

U.S. Pat. No. 4,695,695 to Meek, et al., discloses a mixture for producing fracture-resistant, fiber-reinforced ceramic material by microwave heating. This invention prepares a solid ceramic material that is a mixture of glass, a coupling agent, and a resilient fiber, by enclosing the ceramic mixture with an insulating material. The enclosed ceramic material is then subjected to microwave energy for a sufficient time to bond the ceramic material to the fibers. This method is a sintering method wherein a solid is formed from a glass and fiber composite. No pressure is applied to the material during heating. The absence of a pressure application procedure prevents the treated material from obtaining a near net density. Additionally, this method requires coupling agents, such as oils, glycerol, silicon carbide, water, or sugar, in order to affect sintering by the microwave energy.

An article by Krause, "Microwave Processing of Ceramics: An Interdisciplinary Approach", *Oak Ridge National Laboratory REVIEW*, 1 (1988):48–51, discloses a method for using microwave energy to heat monolithic ceramics without adding impurities. The method of this disclosure obtains an alumina part or workpiece having a density of near 98 percent of the theoretical density. The method of this disclosure uses a high-frequency microwave gyrotron to produce microwaves at 28GHz. The disclosure indicates that alumina is "difficult to heat at 2.45GHz, but it can be heated easily at 28 GHz." This disclosure recognizes the importance of a uniform microstructure in ceramics in order to avoid fractures, but does not disclose a method for applying pressure to a ceramic material being subjected to the microwave energy. The use of a gyrotron, as applied in this method, can produce an average power of 200kW in a continuous wave at the upper-microwave-frequency regime of 28 to 140 GHz. The use of a gyrotron having these characteristics can be prohibitive to many manufacturing facilities due to the expense of the gyrotron and the expertise required to maintain and operate such a gyrotron.

An article by Swain, "Microwave Sintering of Ceramics", *Advanced Materials & Processes Inc. Metal Progress* (Sept. 1988), 76–82, discloses additional information regarding the Oak Ridge National Laboratory gyrotron discussed in the article above. This disclosure further amplifies the unexpected results achieved with the use of microwave energy in sintering ceramics. Microwave energy allows sintering and annealing to occur at temperatures up to 2000° C. (3600° F.) in a vacuum, inert, or oxidizing environment. This process creates a "hot zone" only around the workpiece which can be contained in an insulating liner. The insulating liner prevents impurities that can contaminate other furnaces from migrating to the furnace wall. This further allows the particular ceramic load or type of ceramic material to be changed from run to run without having to modify the apparatus such as is required with changing furnace elements that would be reactive with impurities in other furnaces. Additionally, this disclosure states that the lack of a requirement for furnace cooling time permits more rapid turn around between sintering processes. This disclosure indicates that high-purity alumina cannot be heated using radiation at frequencies as low as 2.45 GHz and also does not disclose a method wherein pressure is used to obtain a near net density.

Two articles by Gabriele, "New Oil Drill Bits Made via P/M Densification Tested", from an unknown source and "Ceracon Awarded $500,000 Numa Tool Contract for New Powdered-Metal Densification System", *Metalworking News* (Oct. 17, 1988), each disclose a process for compacting or densifying powdered metal materials. The exact means for heating the powdered metal is not disclosed by these articles. These articles indicate that the powdered metal material in a pre-densified formation or "green state" is formed by a cold isostatic press. Once formed, the green component is coated with a powdered metal slurry for further densification. Further densification is achieved to the "near-net shaped design" by inserting the green body into a circular open-pot die and completely covering the green body with a heated carbon-based or ceramic granular material known as the pressure transmitting medium. Once the component is immersed in the pressure transmitting medium, a vertical ram press compacts the heating granular material. This process is reported to achieve near net densification and is stated to be more desirable than hot isostatic pressing because the component is held at high temperatures and pressures for a greatly reduced amount of time. This reduced amount of time prevents the breakdown of molecular properties in the material. These disclosures do not involve the utilization of microwave heating.

The industry is lacking an apparatus and a method for isostatically pressing a ceramic powdered metal material that is uniformly heated by microwave energy.

SUMMARY OF THE INVENTION

The invention includes an isostatic press. The isostatic press has a pressure vessel. A fluid medium is available for supply to the pressure vessel. A means for supplying the fluid medium under pressure into the fluid vessel is also provided. The invention further includes a means for transmitting microwave energy into the pressure vessel.

The isostatic press of this invention can include various means for monitoring the temperature and pressure of the fluid medium and/or workpiece within the pressure vessel. The means for transmitting microwave energy can be selected to provide microwave energy in desired frequencies and power levels.

The invention also includes a method for isostatic pressing. The method requires preparing a workpiece, which can be a powder, or a green body, which can be a compacted material, comprising a material that is a microwave coupler. The workpiece or green body is, desirably, a composition comprising a powdered coupler and a first powdered insulator. The green body is immersed in a second powdered insulator which is contained in a closed, compressible container. The immersed green body is then placed into a pressure vessel. Microwave energy is transmitted into the pressure vessel at a sufficient frequency to couple with the coupler. A fluid medium is supplied into the vessel under pressure. The fluid medium can be supplied either concurrently and/or before and/or after the transmission of microwave energy.

The microwave energy couples with the coupler which causes the coupler to heat. The heat of the coupler elevates the temperature of the first powdered insulator by convection. As the temperature of the first powdered insulator increases, the first powdered insulator also couples with the microwave energy. The coupling of the coupler and first powdered insulator with the microwave energy heat the green body.

DETAILED DESCRIPTION OF THE INVENTION

The invention is an isostatic press wherein heat is provided by microwave energy and a method for isostatically pressing a ceramic powdered metal material wherein heating is provided by microwave energy. The isostatic press can be provided by adapting either a cold isostatic press or a hot isostatic press with a means for generating microwave energy to an antennae inside the pressure vessel. The method can be performed by the isostatic press of this invention. The method is accomplished by radiating a composition with microwave energy. The composition couples with the microwave energy and increases in temperature. The isostatic press provides a fluid medium to the pressure vessel to isostatically press the composition as its temperature is elevated.

Figure 1:
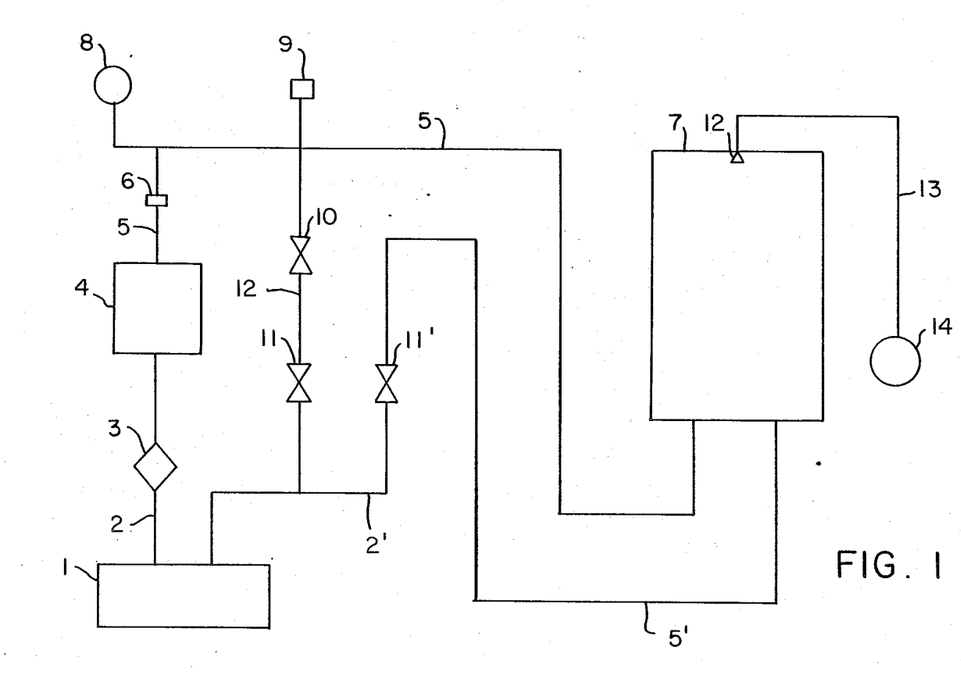
FIG. 1 illustrates a block diagram of the preferred embodiment of the isostatic press of this invention utilizing a liquid fluid medium.

FIG. 1 illustrates a hot isostatic press according to this invention. The isostatic press of this embodiment is an adaptation of a cold isostatic press. A fluid medium storage 1 contains a fluid medium. Desirable fluid mediums, when a cold isostatic press is converted for use with this invention, can be oil or water. The fluid medium is transported through tubing 2 to a filter 3. The fluid medium is further transported through tubing 2 from the filter 3 to a compressor 4. Desirable compressors provide the fluid medium at pressures up to about 60,000 psi. Cold isostatic presses are typically operated at pressures between about 30,000 psi and about 45,000 psi. The pressurized fluid medium is transported through pressure rated tubing 5 through a check valve 6. The pressurized fluid medium is further transported through high pressure tubing 5 to the vessel 7. A gauge 8 with a pressurized switch is provided to monitor the pressure of the fluid medium in the high pressure tubing 5. A ruptured disk 9 is provided with a micrometering valve 10 and a vent valve 11 to provide a return loop 12 to the fluid medium storage 1. This return loop 12 is provided to allow the compressor 4 to continue operation while maintaining the pressure of the fluid medium in the vessel 7 at operational pressure. The high pressure tubing 5 also provides fluid medium to the vessel 7. A return loop of high pressure tubing 5, is provided from the vessel 7 through a vent valve 11, back through tubing 2, to the fluid medium storage 1. This system provides a closed loop system for fluid medium. The vessel 7 is provided with a microwave antennae 12 positioned in the interior or core of the vessel 7. A coaxial cable 13 is provided to the vessel 7 from a means for generating microwave energy 14. The fittings for the coaxial cable 13 to enter the vessel 7 are pressure fittings provided in accordance with the art.

Figure 2:
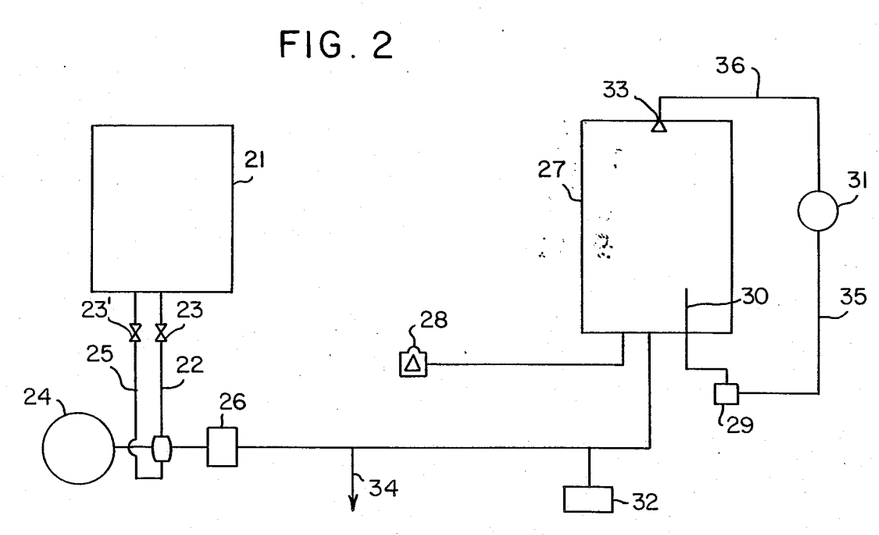
FIG. 2 illustrates an isostatic press according to this invention utilizing a gas fluid medium.

FIG. 2 illustrates a hot isostatic press according to this invention wherein a gas is utilized as the fluid medium. Suitable gases for use as fluid mediums can be inert gases, such as argon or nitrogen, or oxidizing gases, such as pure oxygen. The fluid medium or gas of this embodiment is contained in liquid form in a fluid medium storage 21. The fluid medium is provided through tubing 22 through a check valve 23 to a liquid pump 24. The liquid pump 24 has a return loop 25 with a check valve 23, that can return the fluid medium to the fluid medium storage 21. The liquid pump 24 supplies fluid medium to an electric vaporizer 26. The fluid medium is then provided under pressure to a vessel 27. The vessel of this embodiment is provided with a pressure controller 32 and an exhaust means 34 to release the fluid medium as gas into the atmosphere. A vacuum pump 28 is optionally provided such that the vessel 27 of this embodiment can serve as a vacuum sintering furnace. The isostatic press of this embodiment has an interface computer 29 and thermocouple 30 for monitoring the pressure and temperature within the vessel 27. A means for generating microwave energy 31 provides microwave energy through coaxial cable 36 to an antenna 33 located within the interior or hot zone of vessel 27. The means for generating microwave energy 31 is connected by data and control leads 35 to the interface computer 29.

Figure 3:
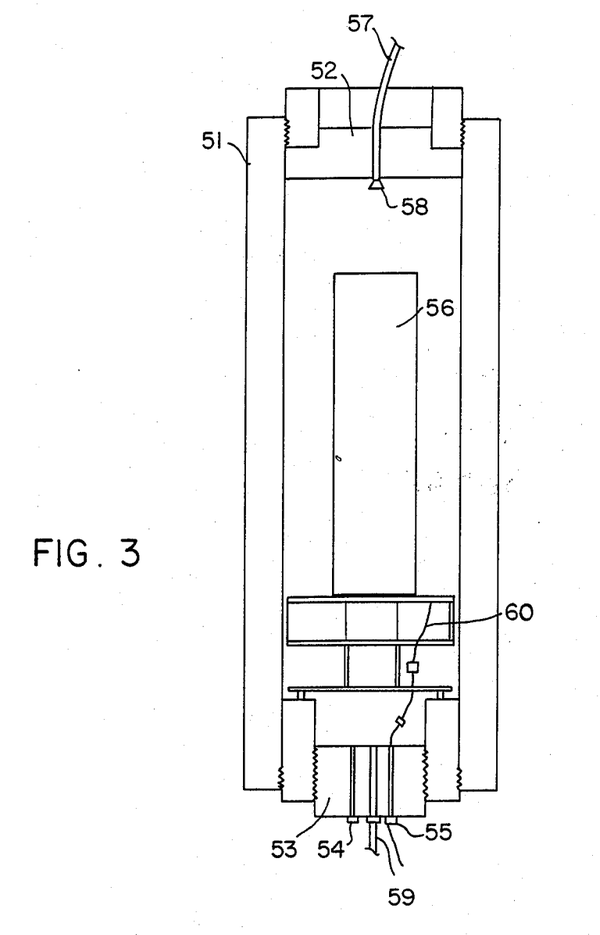
FIG. 3 illustrates a cut away view of a pressure vessel according to this invention.

FIG. 3 illustrates a pressure vessel according to this invention. A pressure vessel 51 is manufactured from steel alloys. The pressure vessel 51 is cylindrical in shape and has an outer diameter and an inner diameter. The volume of the inner diameter defines the interior of the pressure vessel 51. The interior of a cold isostatic vessel is commonly known as the core and the interior of a hot isostatic vessel is commonly known as the hot zone. The pressure vessel 51 is provided with an upper cover 52 and a lower cover 53 a vacuum port 54 can be optionally provided in either the upper cover 52 or lower cover 53. Additionally, a thermocouple lead through 55 can be provided, desirably through lower cover 53, for passing either a thermocouple 60 or fiber optic to monitor the temperature of a part or workpiece 56. A coaxial cable 57 is passed, desirably through the upper cover 52, into the interior of the vessel 51. The coaxial cable 57 can be provided through the upper cover 52 in the same manner that an electric lead through is provided in a standard hot isostatic pressure vessel. The coaxial cable 57 is connected to a microwave antennae 58. Fluid medium is provided to the interior portion of the vessel 51 through port 59.

Figure 4:
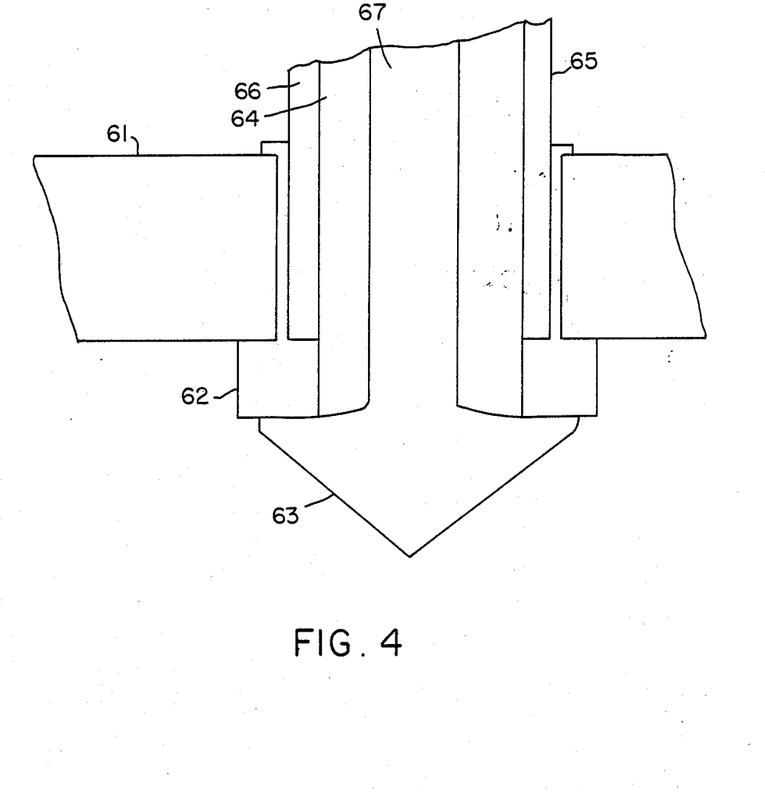
FIG. 4 illustrates a cut away view of a microwave antenna that is suitable for use with this invention.

FIG. 4 illustrates a cut away view of a microwave antenna that is suitable for use with this invention. A vessel wall 61 was a port or pass through for an insulating seal 62. An antenna 63 is passed through the port of the vessel 61 and is insulated from contact with the vessel 61 by standard insulating material 64. The antenna 63 is connected to a means for generating microwave energy by coaxial cable 65. The coaxial cable is formed by an outer coaxial shield 66 and an inner coaxial core 67.

A desirable result of this invention is that approximately 40 percent more space is available within a pressure vessel used with this invention when compared to a pressure vessel of a standard hot isostatic press. This additional space allows for larger pieces to be processed within the same sized vessel and is made possible because of the removal of thermal barriers, the upper coolant plate, the vessel cooling liner, and the base zone and side zone furnaces of the pressure vessel. The microwave antenna of this invention requires relatively little space compared to the furnace elements of a hot isostatic press.

A stirrer to reflect the microwave energy can be provided. A stirrer reflects the microwave energy such that the interior portion of the vessel is evenly exposed or subjected to microwave energy. This allows for uniform, selective heating of the workpiece.

The major components of the microwave apparatus of this invention, including computer control devices, are commercially available. The microwave apparatus requires no special adaptation for use with either a cold or hot isostatic press except that the antenna and lead through for the coaxial cable passed into the interior portion of the vessel must be constructed in a suitable configuration to withstand the temperature and pressure within the vessel during operation. The apparatus of this invention can be constructed to include multiple antennas. Desirably, the microwave energy used in the apparatus of this invention is at 2.45 GHz. This microwave energy can be obtained from commercially available microwave equipment. Such microwave equipment typically operates at between about 1500 watts to about 1 megawatt. Such microwave equipment includes at least one microwave generator, wave guide transmission, resonant cavities, and power supply. This equipment as well as its construction and interrelationship are described in numerous publications within the microwave industry and are known within the art of microwave equipment.

Numerous sources provide suitable equipment for all major, individual components of this invention. Cold and hot isostatic presses are commercially available in standard and customized designs from many suppliers. Cold and hot isostatic presses suitable for adaptation to this invention are available from International Pressure Service, Inc., London, Ohio 43140. Major, individual components of the means for generating microwave energy are also commercially available from many suppliers. Suitable microwave components are available from Litton Industries, Minneapolis, Minn.

The method of this invention requires preparing a workpiece or, desirably, a precompacted green body for positioning in a vessel. The green body can be compacted by standard techniques, such as stamping, before being placed in the vessel. The green body can be powder placed within a mold. A mold for a green body or powder can be a rubber bag which is placed in the pressure vessel. Such rubber bags are in common use in the art of cold isostatic pressing.

The green body is placed within the vessel and the vessel is closed. Microwave energy is transmitted into the interior of the vessel. The microwave energy is provided at a sufficient frequency for a sufficient time and at a sufficient energy level such that the composition forming the green body couples with the microwave energy. The coupling of the composition of the green body with the microwave energy increases the temperature of the green body while the surrounding material, such as the rubber bag or insulator powder, remains transparent to the microwave energy and thereby remains relatively cool. A fluid medium is provided to the interior portion of the vessel under pressure either before, simultaneously with, or after microwave energy is transmitted. The microwave energy is transmitted until the desired temperature is obtained by the workpiece. The pressure within the vessel can be selectively produced, maintained, and released by standard means while the vessel is closed. The green body or workpiece can be removed after the pressure is released because the vessel and any powdered insulator or transparent container of the workpiece remain cool.

An embodiment of this invention includes a method for isostatically compressing or densifying a powdered ceramic, powdered metal, or composite material. The material can be an insulator, a coupler, or semiconductor. The characteristics being processed according to this invention determine the appropriate selection of microwave frequency, power level, and/or time for processing. Such selections are within the scope of the art.

The material processed according to this invention is desirably a mixture of a powdered coupler and powdered insulator, but can be a pure material that couples with microwave energy. The coupler in mixtures can be in relatively low concentrations and desirably couples well with microwave energy. The term coupler, for the purposes of this invention, includes materials commonly known as semiconductors. A desirable semiconductor is provided by silicon carbide whiskers or a particulate.

The material processed according to the method of this invention is desirably mixed or dispersed in low concentrations with a poor coupler or insulator material. The poor coupler or insulator material is a material that couples poorly with microwave energy at low temperatures or temperatures below about 500° C. Typically, insulator materials can be considered as being materials that do not couple well with microwave energy below a temperature between about 350° C. and about 800° C. Certain material are known to couple well with microwave energy at low temperatures and become transparent to microwave energy at higher temperatures.

The mixture or composite of the coupler and insulator material can be compacted into a green body or shaped by any means known in the art. Such means for compacting are desirably stamping or similar mechanical means. This green body is then, desirably, placed into additional insulating material which can be the same insulating material as used to form the mixture. The immersed green body is then placed in a collapsible container such as a rubber bag.

The container of a mixture or composite of material, that is immersed in the insulator, is placed within a pressure vessel and subjected to microwave energy. The microwave energy passes through the insulator material that surrounds the immersed composite. The coupler couples with the microwave energy and generates heat. The heat is convected to the insulator of the mixture is also elevated in temperature. The insulator of the composite, as it is elevated in temperature, also couples with the microwave energy and is further elevated in temperature. As the composite material forming the workpiece increases in temperature, the pressure of the fluid medium is transmitted through the surrounding insulator. The combination of temperature and pressure selectively densifies the material of the workpiece. The surrounding powdered insulator is not densified or heated and functions as a fluid medium to apply isostatic pressure to the workpiece.

The exact temperature and pressure for isostatically pressing a material varies according to the characteristics of the material or the particular results desired. Operating pressures for this invention can range from above atmospheric pressure to about 1 million psi. Desirable embodiments adapted from cold isostatic presses, which utilize liquids as fluid medium, operate at a pressure between about 3,000 psi and about 60,000 psi. Desirable embodiments using adapted hot isostatic presses, which utilize gas as a fluid medium, operate at a pressure between about 3,000 psi and about 250,000 psi. Desirable temperature ranges used with this invention are sufficient to allow densification at a particular pressure without adversely effecting or degrading the composition of the material. Desirable temperatures are between about 1,000° C. up to about 2,500° C. Upper temperature limits are restricted only by the vaporization temperature of the material being processed.

A desirable effect of this invention is that the furnace remains cold while the material or workpiece is elevated in temperature to a desired temperature. If the workpiece is immersed in a powdered insulator, in accordance with the preferred embodiment of the method of this invention, none of the parts of the vessel are exposed to the heat of the workpiece because the surrounding insulator and its container remain cool. This allows the furnace to operate safely at very high pressures that are often not feasible with hot isostatic presses. This increase in operating pressure is possible because the vessel is cold and, therefore, under less stress. A second aspect of the desirable effect of this invention is that the operational temperature limit of an isostatic press is the vaporization temperation of the material being densified at a given pressure. Fiber optics can be used to monitor the temperature of a workpiece. The isostatic press itself if not heated, therefore, the physical limitations of the materials being used to construct the isostatic press or those materials of its temperature measuring system, such as thermacouples, do not limit the upper operational temperature of this device. The method of this invention, wherein a material is isostatically pressed while immersed in a powdered insulator, provides the unexpected result of requiring less binders to form a green body.

An embodiment of the invented method can be performed by a hot press. In this embodiment, the insulator material in which the composite material is immersed acts as the fluid medium. A rigid container, within which the immersing insulator and workpiece are placed, is subjected to pressure from a ram of the hot press. The uniaxial pressure of the ram causes the powdered insulator, surrounding the green body, to apply pressure isostatically to the green body. The powdered insulator provides isostatic pressure because the rigid container directs the powdered insulator in towards the workpiece when struck by the ram. In this embodiment, the green body and surrounding insulator material are subjected to microwave energy, such that the green body is brought up to the desired temperature. The exposure of the green body to microwave energy can be performed by standard hot presses by elevating the temperature of the green body before it is subjected to pressure from the hot press. Hot presses can be designed wherein the exposure of the green body to microwave energy and pressure is simultaneous.

The method of this invention allows for pressure assisted densification of a green body in a cold powder bed provided by the powdered insulator within which the green body is immersed. This cold powder bed acts as the pressure transfer medium and is in direct contact with the green body. The unexpected result provided by this method is that the pressure transfer medium directly in contact with the green body can be of the same composition as the insulator of the composite from which the green body is made. This allows the surface of the green body to only be in contact with a like material. This decreases the possibility of surface contamination of the green body and also facilitates final processing or machining of the workpiece.

The insulator material surrounding the workpiece remains transparent to the microwave energy and, therefore, remains cool throughout the exposure of the workpiece to microwave energy. This provides the desirable result of a cold powder bed after an isostatic cycle is performed that can be readily handled while the workpiece remains at a very elevated temperature. This benefit allows for more cycles to be performed per unit time because as soon as the workpiece is processed the temperature within a vessel can be released and the workpiece within a cold powder bed can be removed. A second container of insulator and a green body can then be put into a vessel and the cycle repeated. This method does not require the cooling of a vessel after a cycle is performed. The heated workpiece can be allowed to cool within the cold powder bed after it is removed from the vessel.

Insulators suitable for use informing the green body or in providing a cold powder bed within which the green body can be immersed are generally known in the art. The examples of the common insulators include alumina, aluminum nitride, zirconia, and silicon nitride. When forming the composite material, these insulators can be mixed with a low concentration of a conductor, semiconductor, or coupling agent.

Conductor, semiconductor, and coupling agents are also known within the art. Coupling agents are polarized compounds. Such compounds typically include the presence of $NO_2$, $NO_3$, $CO_2$, and $NH_3$ groups. A desirable material for use as a semiconductor when forming the composite used in the method of this invention includes silicon carbide fibers or "whiskers". Metals or powdered metals are conductors at concentrations in a material that permit the metals or powdered metals to couple with microwaves. The length of these fibers can be selected such that coupling of the microwave energy is enhanced.

A concentration of a coupler must be sufficient to readily couple with the microwave energy being used. The concentration of insulator to coupler can vary widely. Suitable concentrations are between about 0.5 and about 45 weight percent of coupler to insulator. Desirable concentrations are between about 5 and about 37 weight percent of coupler to insulator. The most desirable concentrations are between about 5 and about 10 weight percent of coupler to insulator. Alumina with a coupler at a concentration of 5 weight percent can be elevated to a temperature between about 1000° C. and about 2500° C. using 2.45 GHz microwave energy.

The most desirable embodiments of the method of this invention introduce microwaves into a workpiece contained in a powder bed or solid die pressure transmission medium such that the microwaves couple well to the workpiece while coupling very poorly to the pressure transmission medium surrounding the workpiece. Ideally, this pressure transmission medium is a good insulator trapping any heat or heat generated radiation from escaping once generated as a result of the microwaves coupling with the workpiece and is also nonreactive to the workpiece during processing. There are several procedures that are suitable for obtaining these conditions. The following procedures are representations.

(1) The workpiece surrounding pressure transmission medium, and microwave frequency can all be selected to meet the following parameters.

The part couples to the microwaves at the chosen microwave frequency better than it does with the surrounding medium at the starting temperature. As the workpiece begins to heat, it couples more efficiently to the microwaves at the elevated temperature. This is because, when two masses are in a microwave field and one mass couples to the microwaves better than the other mass, the heating of the masses is sequential and the better coupling material heats before the lesser coupling material.

The preferred method of this invention uses a microwave frequency of 2.45 HGz which couples poorly to a wide variety of ceramic materials, such as aluminum oxide, silicon nitride, zirconium oxide, boron nitride, boron carbide, and others, at 0° C. to 800° C. If a green body is composed of a composite of one or more of these materials in a combination with a coupler, such as a conductor, semiconductor, or material with a very different dielectric constant, and that green body is placed in a surrounding mass of one or more of these materials, the green body begins to be selectively heated. This is because the coupling material greatly improves the green body's ability to couple to the microwave field. As the green body begins to heat, any of these materials or a mixture of these materials begins to couple to the microwave field more efficiently as the temperature of the green body rises up to about 2000° C. The surrounding material, which is a comparatively poor coupling material, does not heat.

For example, silicon carbide fibers or particulate can be mixed with aluminum oxide, silicon nitride or zirconium oxide particulate in a ratio of 5 percent to 95 percent of semiconductor by volume and then formed into a green body. This green body can be placed in a powder bed composed of silicon nitride. Zirconium oxide, aluminum oxide, or a mixture thereof and the green body and powder bed compressed to form a compact of material. This compact of material can then be placed in a 2.45 GHz microwave field in a 1500 watt microwave oven shaped in the form of a cylinder closed at one end and having a ram that can apply 220,000 pounds force to the opposite end. After 14 minutes of applying pressure, the microwave generator can be turned off, the ram can be retracted, and the compact can be removed. The compact is then broken open. The surrounding material is cool and can be easily broken away from the now densified composite part that is now at about 1200 to 1500° C. The surrounding material does not sinter because it is under 200° C. to within 0.010 inch of the surface of the workpiece. The surrounding material has transferred pressure to the green body while (1) allowing the microwave field to interact with the green body and (2) insulating the green body by not allowing any of the infrared heat generated in the green body to escape. Since the surrounding powder bed can be made of the same material as the matrix material of the green body, there are no undesirable reactions or contamination between the green body and the surrounding powder bed during densification. The workpiece heats uniformly because in the early stages of heating only the coupling agent couples to the microwave field and the green body remains relatively transparent to the microwave field. Throughout the process, the powder bed remains very transparent to the microwave field.

Alternatively, the powder compact can be placed in a rubber bag. It is then placed in a similar cylinder closed on both ends that is filled to pressures of less than 3 K.s.i. to 1,000 K.s.i. with a fluid that is a material that couples poorly with the microwave field at the chosen frequency. Microwaves are introduced into this container using an antenna as described above for the same period of time with a very similar result.

If the green body is made entirely of a material such as silicon carbide or titanium carbide, then the green body heats very rapidly at most microwave frequencies. This pure material can be used for selective heating of the green body and heats mostly at the surface of the green body due to the very efficient coupling of the material. This effect also occurs with many powdered metal parts.

(2) The workpiece, surrounding pressure transmission medium, and microwave frequency can be selected to meet the following parameters.

The workpiece is surrounded by a thin layer of a material that couples to the chosen microwave frequency at the beginning temperature, but then, as the temperature of this layer of material increases, it becomes transparent to the microwaves. This material is surrounded by a powder bed using materials described above. A part comprising a noncoupling or reflective material can be heated to a very specific temperature in this type of system while being densified under pressure. A coupling material can be held at temperature for very long periods of time without bringing the surrounding material at the surface to coupling temperature.

For example, a powdered metal green body can be surrounded by a ¼ inch thick layer of ferrite material such as of barium titanate. This compact is placed in a powder bed of aluminum oxide and a compact is formed. The compact is processed as described above. The barium titanate couples well to microwaves at a frequency of 2.45 GHz until it reaches its curie point of 538° C. at which temperature it becomes very transparent to microwaves. In this instance, the metal part can be heated to the precise temperature at which the barium titanate stops coupling to the microwave field and held at that temperature for a long period of time.

A composite green body can be surrounded by barium titanate, in a powder bed of the matrix material of the green body, for an extended period of time at an elevated temperature. The surrounding powder bed is shielded from the very high surface temperature of the composite green body by the barium titanate which at the high temperature does not couple with the microwave field. The green body itself can be composed of a ferrite material such as barium titanate and surrounded in a powder bed and processed as in the procedure above using microwave frequencies selected to heat the barium titanate to the curie point for purposes of densifying the material as in the first procedure. This greatly enhances the quality of capacitors and other electronic components currently made from these ferrite materials. These materials have varying curie points depending upon molecular composition.

(3) The workpiece, surrounding pressure transmission medium, and microwave frequency can all be selected to meet the following parameters.

The part can be surrounded by a thin layer of a composite mixture consisting of a coupling agent such as silicon carbide fibers or particulate, dispersed in a matrix material that does not sinter at high temperatures such as aluminum carbide. This compact is then placed inside a powder bed as in the first procedure above or is first coated with a ferrite material and then placed in the powder bed. When this is processed as in the first procedure, the thin layer of composite material becomes a small furnace in which the workpiece can be heated even if the workpiece does not couple to microwaves and can be densified under pressure inside a cold compact. This system brings the surface of the workpiece to the desired temperature much faster than current methods where a large volume of powder is heated slowly by conduction before the powder can begin heating the surface of the workpiece.

(4) The workpiece surrounding pressure transmission medium, and microwave frequency can all be selected to meet the following parameters.

The metal workpiece is placed in a powder compact as in the first procedure, except that the powder bed and the workpiece have very different dielectric constants resulting in the formation of an interference mirror that traps the microwaves at the surface of the workpiece. This results in very rapid heating of the metal workpiece that would otherwise reflect microwave energy without heating. If two materials of different dielectric constants are separated by ½ of the wavelength of the microwaves, the microwaves are trapped in the interface and cause very rapid heating of the workpiece. The workpiece is processed as in the first procedure.

(5) In all of the above procedures, the powder bed can be replaced by a rigid shape or die of the same material as the powder bed to apply a uniaxial force or impart a shape while maintaining the same system.

A resistive material can be used in the examples where ferrites are mentioned except that the material cannot become transparent to microwaves and hold a specific temperature in the oven.

Coupling agents can be combined with metal powders (1 to 99 volume percent TiC or TiC/WC or TiC/TiN coupling agent) plus (1 to 99 percent Ni or Cu or other metal powder or metal powder combination) and processed as in the first procedure with the same result. The United States currently uses more than 900 million dollars worth of TiC/WC plus Cu cutting tool inserts every year at present and this system holds the promise of lowering the cost of producing those parts while improving material properties.

EXAMPLES

The following examples provide specific embodiments of this invention. Unless otherwise indicated all percentages are weight percents.

EXAMPLE 1

Example 1 demonstrates the use of 2.45 GHz microwave energy to elevate the temperature of a green body formed from commercially available alumina and silicon carbide whiskers. The green body is surrounded in powdered silicon nitride. The green body is densified by a hot press. Example 1 is as follows.

A 3-inch alumina billet or green body having 5 percent silicon carbide is placed in a ceramic dish filled with powdered silicon nitride. The dish, powdered silicon nitride, and billet are placed in a General Electric 2.45 GHz microwave kitchen oven. The is operated at full power. The billet, after 7 minutes, suddenly begins to heat very rapidly. The billet is a dull red at 7 minutes of exposure to the microwaves and a bright red-yellow after another minute and a half.

A ten-fold increase in temperature is obtained by placing the billet in the powdered insulator over the temperature that is obtained when the same billet is not immersed in a powdered insulator. The powdered silicon nitride insulator allows microwaves to heat the billet while remaining transparent to microwaves and cool. The powdered silicon nitride insulator inhibits the escape of heat from the billet. The billet heats to a temperature high enough to cause sintering.

The white hot billet is placed, while remaining immersed in the powdered silicon nitride insulator, in a rigid steel pipe. The contents of the pipe are compressed at 20,000 psi by a hot press. The billet is densified, cooled, and available for machining to a final configuration.

EXAMPLE 2

Example 2 demonstrates the use of 2.45 GHz microwave energy to elevate the temperature of a powdered mass or workpiece formed from commercially available powdered aluminum oxide and silicon carbide whiskers. The workpiece is surrounded in powdered aluminum oxide of the same type used to form the workpiece. The workpiece is densified in a cold isostatic press adapted according to the preferred apparatus as described by FIG. 1. Example 2, also, represents the preferred embodiment of the method of this invention and is as follows.

Aluminum oxide powder having 5 percent silicon carbide whiskers is placed in powdered aluminum oxide. The entire mass is contained in a rubber bag and is placed inside a vessel of the cold isostatic press. The workpiece is heated by 2.45 GHz of microwave energy for twenty minutes. Simultaneously, the rubber bag and its contents are pressurized at 30,000 psi and held at that pressure until the microwave transmission is terminated.

The transmission of microwave energy and the application of pressure are terminated after 20 minutes. The rubber bag is removed and the workpiece is examined. The workpiece is densified to near net density without been pre-compacted into a green body.

EXAMPLE 3

Example 3 demonstrates the use of both 2.45 GHz and 28 GHz microwave energy to elevate the temperature of a green body formed from commercially available zirconia and silicon carbide whiskers. The green body is densified by a hot isostatic press according to FIGS. 2 and 3. Example 3 is as follows.

A workpiece of 170 grams of powdered zirconia having 43 percent silicon carbide whiskers is formed by pouring into a container of pure zirconia powder. The entire mass is heated by 2.45 GHz of microwave energy to about 1200° C. and presents a red-yellow color in 8 minutes. The surrounding zirconia powdered insulator without silicon carbide whiskers remains at room temperature with almost no apparent heating. This indicates that selectively heating of the workpiece occurs while the surrounding environment of the same material remains cool. This avoids contamination of the workpiece. The workpiece is exposed to the microwave energy for a total of 15 minutes and allowed to cool. The mixture forms a billet having substantial sintering.

The sintered billet is placed in the vessel of the adapted hot isostatic press without being immersed in an insulator. The billet is exposed to 2.45 GHz of microwave energy for 20 minutes. A gas pressure of 45,000 psi is applied in the vessel after 7 minutes of transmitting microwave energy and is held for 20 minutes after the transmitting of microwave energy is terminated. The pressure is then released and the densified workpiece is removed with tongs. The billet has a near net density and is available for machining.

I claim:

1. A method for isostatically pressing comprising:

preparing a workpiece, said workpiece being a composition comprising a powdered coupler and a first powdered insulator;

immersing said workpiece in a second powdered insulator, said second powdered insulator being in a compressible container;

placing said contained, immersed workpiece into a pressure vessel;

transmitting microwave energy into said pressure vessel at a sufficient frequency for a sufficient time to elevate said workpiece to a desired temperature; and densifying said workpiece with a fluid medium supplied into said pressure vessel under pressure.

2. The method of claim 1, wherein said transmitting of microwave energy and said densifying of said workpiece occur simultaneously.

3. The method of claim 1, wherein said first powdered insulator and said second powdered insulator are of identical chemical composition.

4. The method of claim 1, wherein said workpiece is compacted before immersing into said second powdered insulator.

5. The method of claim 1, wherein said powdered coupler is semiconductor whiskers.

6. The method of claim 5, wherein said semiconductor whiskers are silicon carbide whiskers.

7. The method of claim 6, wherein said silicon carbide whiskers are in a concentration of from about 0.5 percent to about 45 percent.

8. A method for isostatically pressing comprising:

preparing a green body, said green body being a composition comprising a powdered coupler and a first powdered insulator;

immersing said green body in a second powdered insulator;

elevating the temperature of said green body by microwave energy; and pressing by mechanical means said green body, said second powdered insulator being a pressure transfer medium.

9. The method of claim 8, wherein said transmitting of microwave energy and said pressing of said pressure transfer medium occur simultaneously.

10. The method of claim 8, wherein said first powdered insulator and said second powdered insulator are of identical chemical composition.

11. The method of claim 10, wherein said semiconductor whiskers are silicon carbide whiskers.

12. The method of claim 11, wherein said silicon carbide whiskers are in a concentration of from about 5 percent to about 10 percent.

13. A method for isostatically pressing comprising:

preparing a workpiece, said workpiece comprising a coupler;

placing said workpiece into a pressure vessel;

transmitting microwave energy into said pressure vessel at a sufficient frequency for a sufficient time to elevate said workpiece to a desired temperature; and densifying said workpiece with a fluid medium supplied into said pressure vessel under pressure.

14. The method of claim 13, wherein said transmitting of microwave energy and said densifying said workpiece occur simultaneously.

* * * * *